United States Patent [19]
Vater

[11] Patent Number: 5,664,125
[45] Date of Patent: Sep. 2, 1997

[54] PCMCIA INTERFACE SYSTEM WITH ADJACENTLY ALIGNED CABLE TO PREVENT CROSSTALK

[75] Inventor: Siegfried Vater, Erfurt, Germany

[73] Assignee: SCM Microsystems (U.S.) Inc., Los Gatos, Calif.

[21] Appl. No.: 567,889

[22] Filed: Dec. 8, 1995

[51] Int. Cl.$^6$ .............................. G06F 3/00; G06F 13/00
[52] U.S. Cl. ...................... 395/309; 439/497; 439/498; 395/281
[58] Field of Search ............................ 395/309; 439/67, 439/77, 492, 493, 494, 495, 496, 497, 498, 499

[56] References Cited

U.S. PATENT DOCUMENTS 5,380,223  1/1995  Marsh et al. .......................... 439/610
5,540,597  7/1996  Budman et al. .
5,574,682  11/1996  Shinohara .

*Primary Examiner*—Jack B. Harvey
*Assistant Examiner*—Rupal D. Dharia
*Attorney, Agent, or Firm*—Robert P. Sabath; Oblon, Spivak, McClelland, Maier & Neustadt, P.C.

[57] ABSTRACT

A PCMCIA multi-cable interface system and method which parallel interface cables include analogous multicharacter pin line groups in adjacent cables, which are grouped adjacently to each other by kind of group. Control pin line groups in adjacent cables are established adjacent to each other. Status pin line groups in adjacent cables are established adjacent to each other. Interface pin line groups in adjacent cables are established adjacent to each other. Data pin line groups in adjacent cables are established adjacent to each other. Address pin line groups in adjacent cables are established adjacent to each other.

17 Claims, 14 Drawing Sheets

PCMCIA INTERFACE SYSTEM WITH ADJACENTLY ALIGNED CABLE TO PREVENT CROSSTALK

TECHNICAL FIELD OF THE INVENTION

This invention relates to systems and methods for connecting Personal Computer Memory Card International Association (PCMCIA) card sockets with a bus and in particularly relates to systems and methods for connecting PCMCIA card sockets with an industry standard architecture (ISA) bus, an extended industry standard architecture (EISA) bus, or a peripheral computer interface (PCI) bus.

BACKGROUND

Conventionally, a PCCard® controller chip is connected between an ISA bus, PCI bus, or an EISA bus; and one or more PCCard® sockets. The selected bus and the sockets may be remote from each other, requiring a socket controller chip to be located either proximate to the socket or sockets or proximate to the selected bus. According to one conventional arrangement, if the socket controller chip is located proximate to a socket or sockets, then one or more cables are connected between the socket controller chip and the selected bus. According to another conventional arrangement, if the socket controller chip is located proximate to a selected bus, then the cables are connected between the socket controller chip and the socket or sockets. Such arrangements of the prior art are hampered by crosstalk between adjacent cables.

For example, when address or data information is applied to the bus, crosstalk may result to adjacent control signal lines, causing the control signals to change state and possibly resulting in a premature and erroneous read or write.

As is well known, the PCCard® standard is established by the Personal Computer Memory Card International Association (PCMCIA). The PCMCIA organization is a nonprofit trade association founded in 1989 to define a standard memory card interface. The memory-only standard defines the current 68 pin physical interface. PC Card products are of particular significance in the portable and notebook computer markets, involving laptops and notebooks.

Typically, the number of lines required for the connection with the socket controller chip is greater than the number of lines in a single cable. Accordingly, two or more cables are connected in parallel, as for example shown in FIG. 1c.

The lines connecting with the socket controller chip include data lines, address lines, status lines, and control lines. In the case of two cables connecting with such lines, these cables will be physically adjacent to each other for all or some of the path between the socket controller chip and the connecting socket or selected bus.

Currently, in such parallel cable systems connecting with the socket controller chip, the cable lines are organized so that a data line in one cable may run adjacent a status or control line in the other cable line. Thus, data line transitions may reflect or spike during or near transitions and crosstalk into the adjacent status, interface, or control line or lines. Such crosstalk can disrupt or disable system operation.

It is desirable to prevent crosstalk, in a cost effective way, in physically adjacent lines of parallel cables, without use of shielding material or intervening conductive planes.

SUMMARY OF THE INVENTION

According to the present invention, crosstalk is prevented or diminished by establishing corresponding groups of kinds of lines in adjacent cables coupled to a socket controller chip. According to an embodiment of the present invention, a group of data lines in a first of two or more adjacent cables is established parallel and adjacent to a corresponding group of data lines in a second of the two adjacent cables. According to an embodiment of the present invention, a group of status lines in a first of several adjacent cables is established parallel and adjacent to a corresponding group of status lines in a second of the two adjacent cables. According to an embodiment of the present invention, a group of control lines in a first of two adjacent cables is established parallel and adjacent to a corresponding group of control lines in a second of the two adjacent cables.

According to an embodiment of the present invention, a group of control lines in a first of two adjacent cables includes interspersed ground lines. According to an embodiment of the present invention, a group of status lines in a first of two adjacent cables includes interspersed ground lines.

According to an embodiment of the present invention, first and second adjacent cables connecting with the socket controller chip include at least first and second line groups selected from the following set consisting of data lines, address lines, status lines, and control lines. Adjacent ones of said first and second line groups are separated by a least one ground line.

Further according to the present invention groups of similar kinds of signals (address, date, or control for example) are provided or applied in corresponding regions of first and second cables connecting or coupled with a controller or socket.

DETAILED DESCRIPTION OF THE INVENTION

Figure 1A:
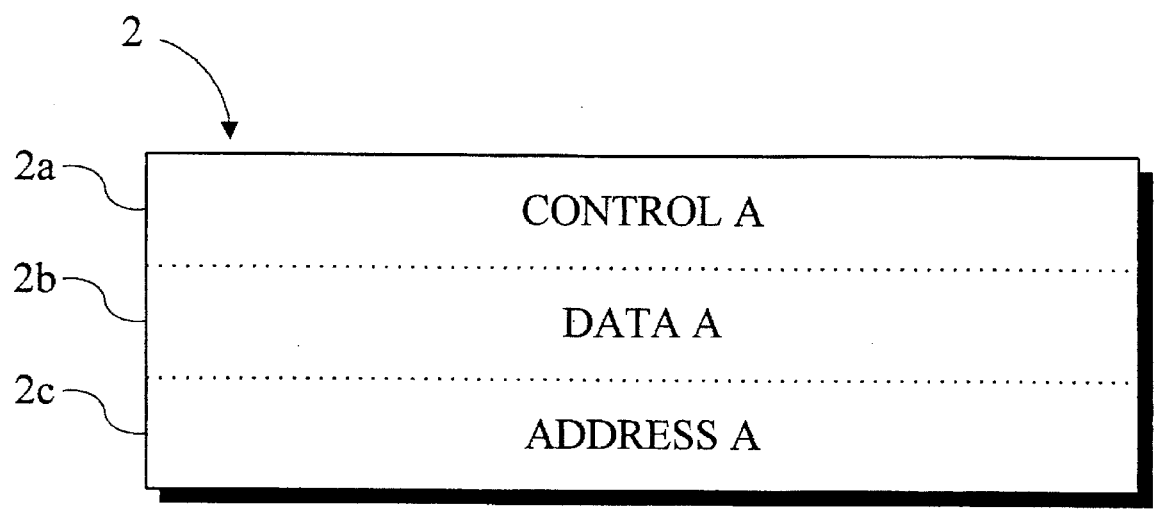
FIG. 1a is a top schematic diagram of a first cable according to the present invention, including first control lines A, first data lines A, and first address lines A respectively arranged linearly adjacent and parallel to each other.
Figure 1B:
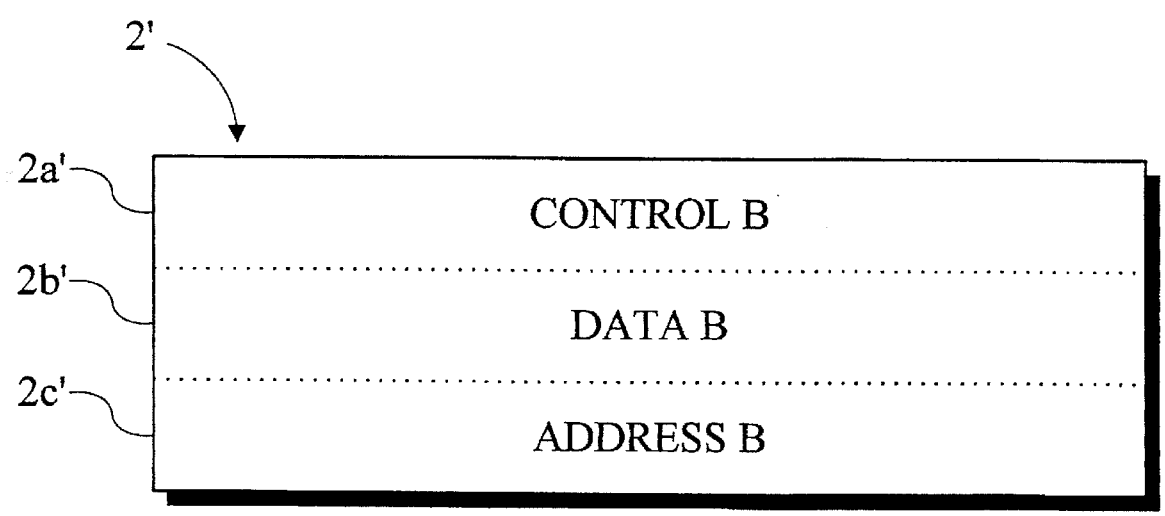
FIG. 1b is a top schematic diagram of a second cable according to the present invention, including second control lines B, second data lines B, and second address lines B, respectively arranged linearly adjacent and parallel to each other.

FIG. 1a is a top schematic diagram of a first cable 2 according to the present invention, including first control lines A (2a), first data lines A (2b), and first address lines A (2c) respectively arranged linearly adjacent and parallel to each other. FIG. 1b is a top schematic diagram of a second cable 2' according to the present invention, including second control lines B (2a'), second data lines B (2b'), and second address lines B (2c'), respectively arranged linearly adjacent and parallel to each other. Physically, each of cables 2 and 2' is a ribbon of parallel insulated electrical wires fabricated in insulative plastic. The ribbons are terminated at each end by a well-known connector which connects the respective wires to associated pins. A typical cable includes a selected number of parallel lines, for example without limitation 40–50 parallel lines. The cables are typically flat, so that the 50 lines are arranged in a single plane.

Figure 1C:
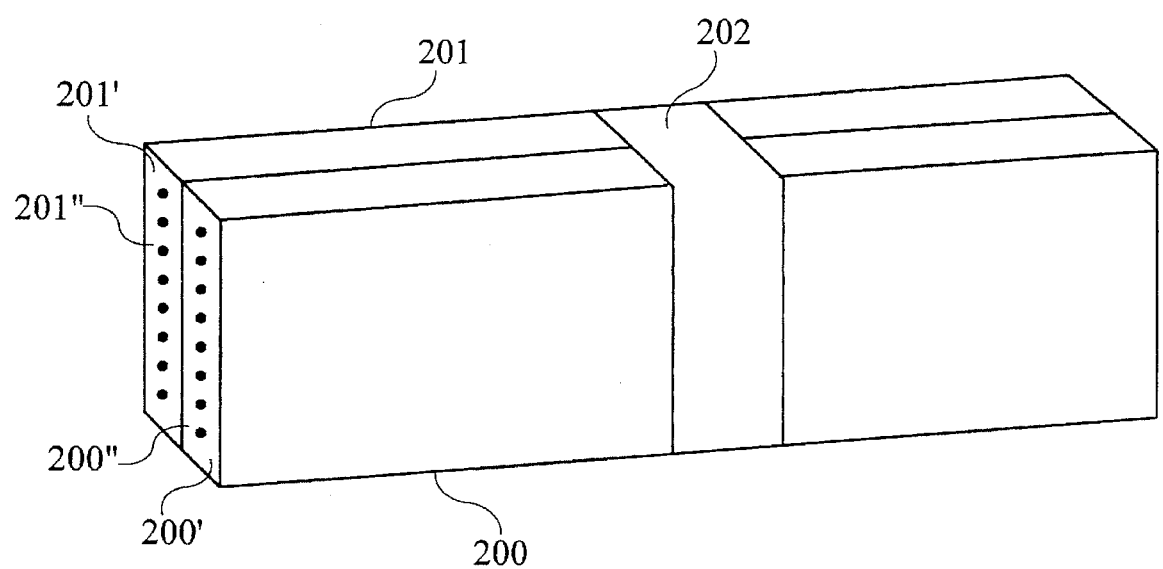
FIG. 1c is a schematic diagram of first and second cables according to the prior art, arranged adjacent and parallel to each other with a central band holding first and second cables in alignment with each other.

FIG. 1c is a schematic diagram of first and second cables 200 and 201 respectively according to the present invention, arranged adjacent and parallel to each other with a central band 202 holding first and second cables in alignment with each other. Each of cables 200 and 201 includes a corresponding cross-sectional edge, respectively 201' and 202'. The respective edges 201' and 202' respectively include first and second pluralities of pins 201" and 202" for electric communication with a PCCard socket or PCCard controller.

Figure 2A:
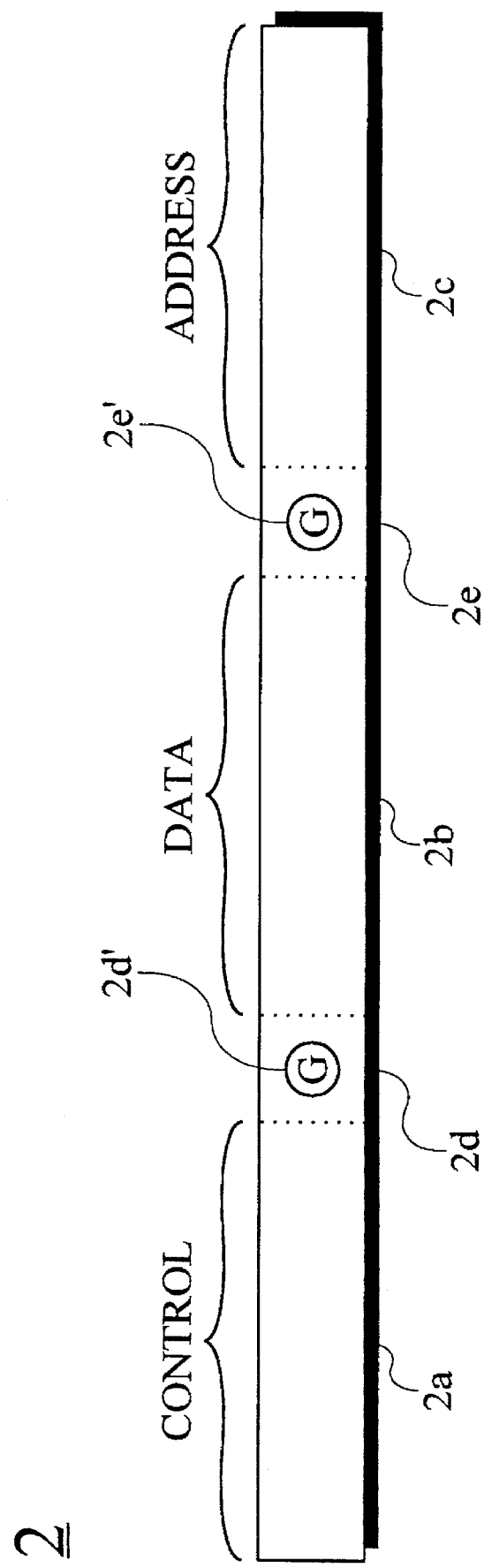
FIG. 2a is a end schematic diagram of a first cable according to the present invention, including a first group of control lines, a first group of data lines, and a first group address lines respectively arranged linearly adjacent and parallel to each other, each group being separated from an adjacent group with a ground line.

FIG. 2a is a end schematic diagram of first cable 2 according to the present invention, including a first group of control lines 2a, a first group of data lines 2b, and a first group address lines 2c, respectively arranged linearly adjacent and parallel to each other, each of groups 2a–2c being separated from an adjacent group with a ground line. In particular, first group of address lines 2c is separated from first group of data lines 2b by a ground line 2e. Similarly, first group of control lines 2a is separated from first group of data lines 2b by a ground line 2d.

Figure 2B:
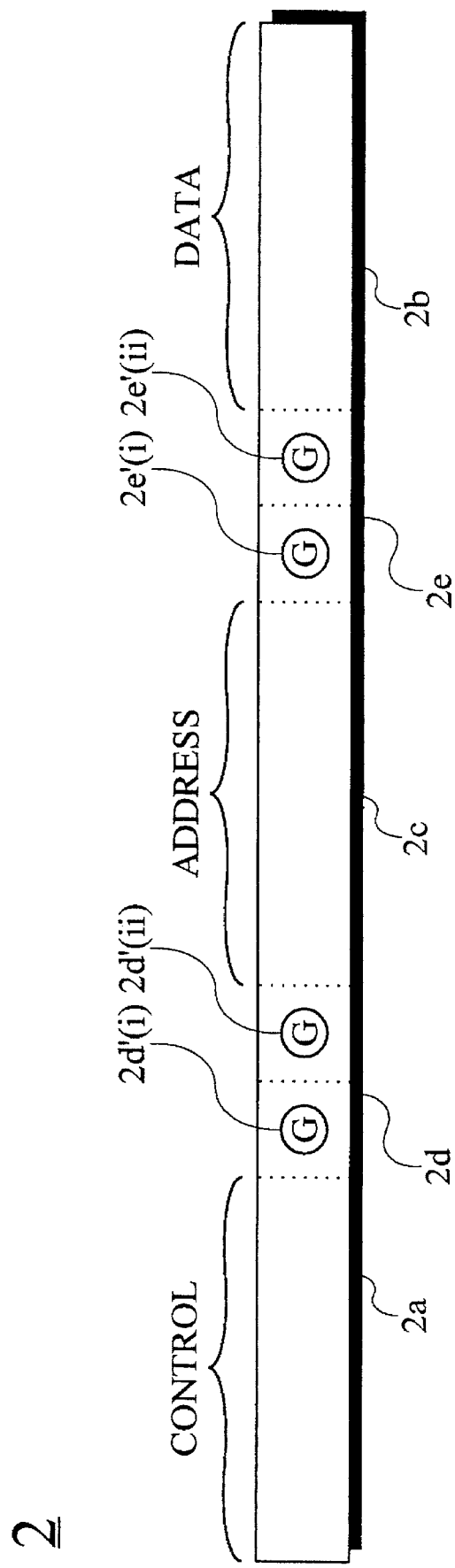
FIG. 2b is a end schematic diagram of a first cable according to the present invention, including a first group of control lines, a first group of data lines, and a first group address lines respectively arranged linearly adjacent and parallel to each other, each group being separated from an adjacent group with a group of ground lines.

FIG. 2b is a end schematic diagram of a first cable 2 according to another embodiment of the present invention. First cable 2 is shown in schematic cross section with the individual lines or wires of first cable 2 coming either toward the viewer of FIG. 2b or away from the viewer. First cable 2 includes a first group of control lines 2a, a first group of data lines 2b, and a first group address lines 2c, respectively arranged linearly adjacent and parallel to each other. Each group of lines is separated from its adjacent group or groups with a group or plurality of ground lines. In particular, as shown in FIG. 2b, control lines 2a are separated from address lines 2c by ground lines 2d including first and second ground lines $2d'(i)$ and $2d'(ii)$. Further, as shown in FIG. 2b, data lines 2b are separated from address lines 2c by ground lines 2e including first and second ground lines $2e'(i)$ and $2e'(ii)$.

Figure 2C:
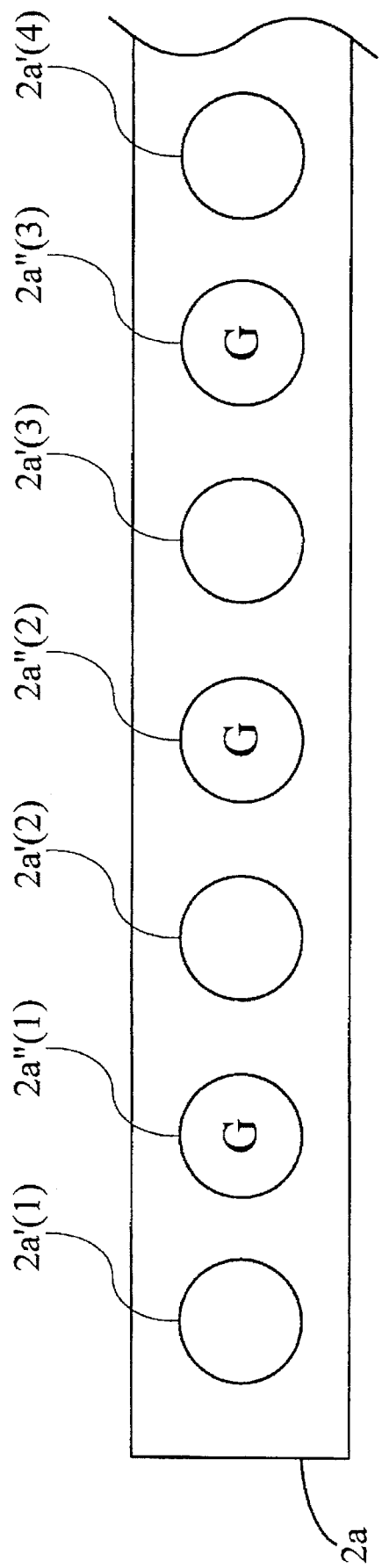
FIG. 2c is a end schematic diagram of a portion of a first cable according to the present invention, including a first group of Control lines, each control line being separated from an adjacent control line with at least a single ground line.

FIG. 2c is an end schematic diagram of a portion of a first cable according to the present invention, including a first group of control lines 2a, each control line $2a'(i)$ being separated from an adjacent control line $2a'(i+1)$ with at least a single ground line $2a''(i)$. Thus according to one embodiment of the present invention, a first control line $2a'(1)$ is separated from an adjacent control line $2a'(2)$ with at least a single ground line $2a''(1)$.

Figure 3:
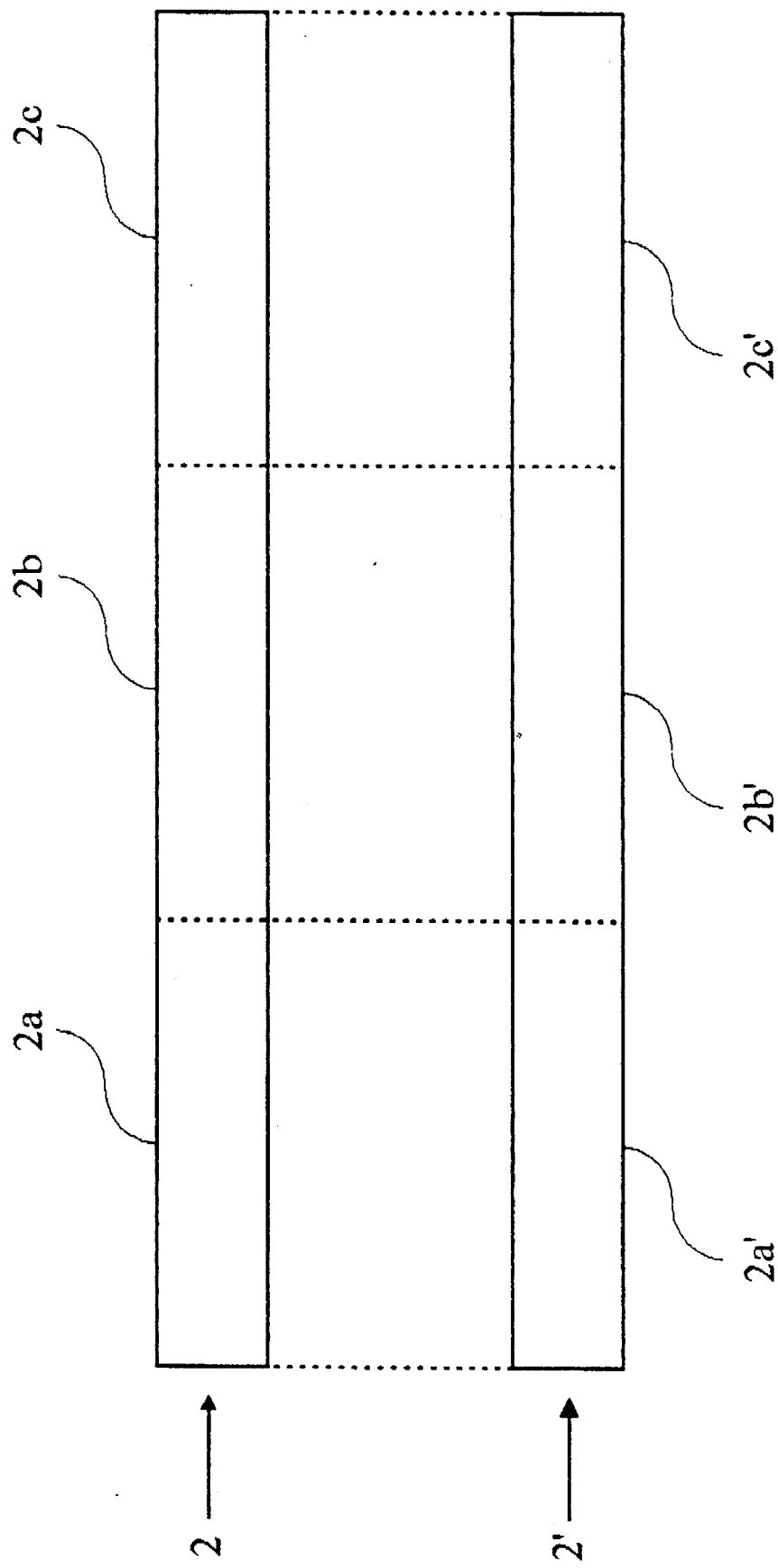
FIG. 3 is an end schematic diagram of first and second adjacent cables according to the present invention, including corresponding first and second control lines, first and second data lines, and first and second address lines A.

FIG. 3 is an end schematic diagram of first and second adjacent cables 2 and 2' according to the present invention, including corresponding first and second control line regions respectively 2a and 2a', first and second data line regions 2b and 2b', and first and second address lines respectively 2c and 2c'. As shown in FIG. 3, first and second control line regions 2a and 2a' correspond to each other, and to the extent that cables 2 and 2' come into close proximity, cross-talk is minimized or eliminated in that control lines are set into proximity of each other. In particular, cross-talk is minimized or eliminated in that no data lines are set in close proximity with control lines. Putting data lines in close proximity to control lines is likely to cause cross talk. In working operation, cables 2 and 2' may be directly adjacent to each other, with the result that corresponding ones of the 50 lines in each of cables 2 and 2' may each be directly across from each other. According to one embodiment of the present invention, each of cables 2 and 2' are physically bound or secured to each other between their respective ends. As a result of possible twisting or sidewards displacement, individual ones of the lines in cables 2 and 2' may be laterally offset with respect to each other by the width of a single wire or by the width of several wires. In the event of such a sidewards displacement, particular ones of the wires in a certain group of cables may have a direct correspondence not with similar types of wires, but with the ground lines fabricated between particular regions.

Figure 4A:
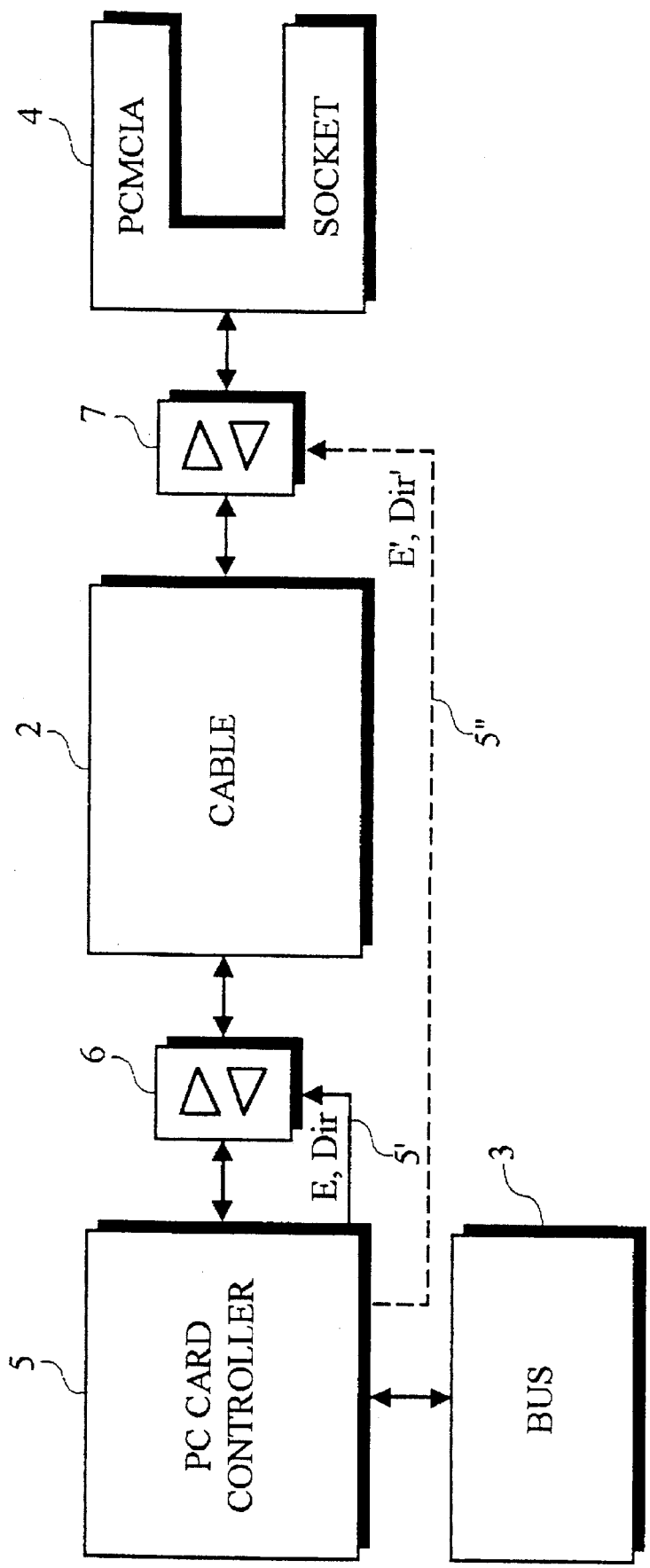
FIG. 4a is a PCMCIA system including an ISA bus, a PC card controller connected to the ISA bus, a PCCard® socket connected with the PC card controller with a cable according to the present invention.

FIG. 4a is a PCMCIA system including an ISA bus 3, a PC card controller 5 connected to ISA bus 3, a PCMCIA socket 4 connected with PC card controller 5 with a cable 2, according to the present invention. The PCMCIA system according to the present system further includes first and second bidirectional drivers 6 and 7 each connected to cable 2. Bidirectional driver 6 is connected between PC card controller 5 and cable 2. Bidirectional driver 6 is under control of PC card controller 5 which exercises control signals ENABLE (i.e., "E") and DIRECTION (i.e., "Dir"). ENABLE enables or disables bidirectional signal traffic through bi-directional driver 6. Bidirectional driver 7 is connected between PCMCIA socket 4 and cable 2. Bidirectional driver 7 is under control of PC card controller 5 which exercises control signals 5", ENABLE (i.e., "E'") and DIRECTION (i.e., "Dir'"). ENABLE enables or disables bidirectional signal traffic through bidirectional driver 7.

Figure 4B:
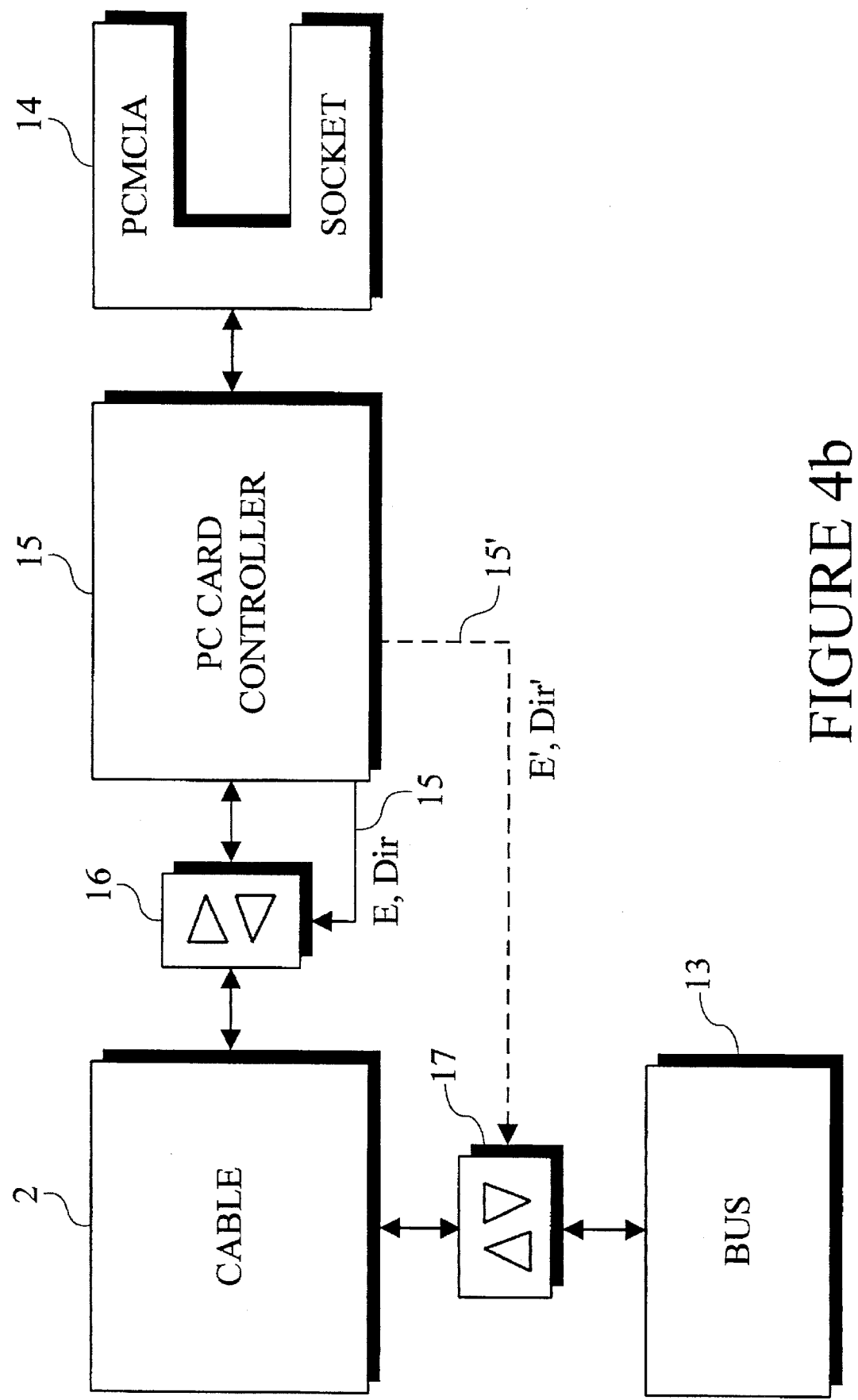
FIG. 4b is a PCMCIA system including an ISA bus and a PC card controller connected to the ISA bus with a cable according to the present invention.

FIG. 4b is a PCMCIA system including an ISA bus 13, a PC card controller 15 connected to PCMCIA socket 14, said ISA bus connected with PC card controller 15 with a cable 2 according to the present invention. The PCMCIA system according to the present system further includes first and second bidirectional drivers 16 and 17 each connected to cable 2. Bidirectional driver 16 is connected between PC card controller 15 and cable 2. Bidirectional driver 16 is under control of PC card controller 15 which exercises control signals ENABLE (i.e., "E") and DIRECTION (i.e., "Dir"). ENABLE enables or disables bidirectional signal traffic through bidirectional driver 16. Bidirectional driver 17 is connected between ISA bus 13 and cable 2. Bidirectional driver 17 is under control of PC card controller 15 which exercises control signals 15", ENABLE (i.e., "E'") and DIRECTION (i.e., "Dir'"). ENABLE enables or disables bidirectional signal traffic through bi-directional driver 17.

Figure 4C:
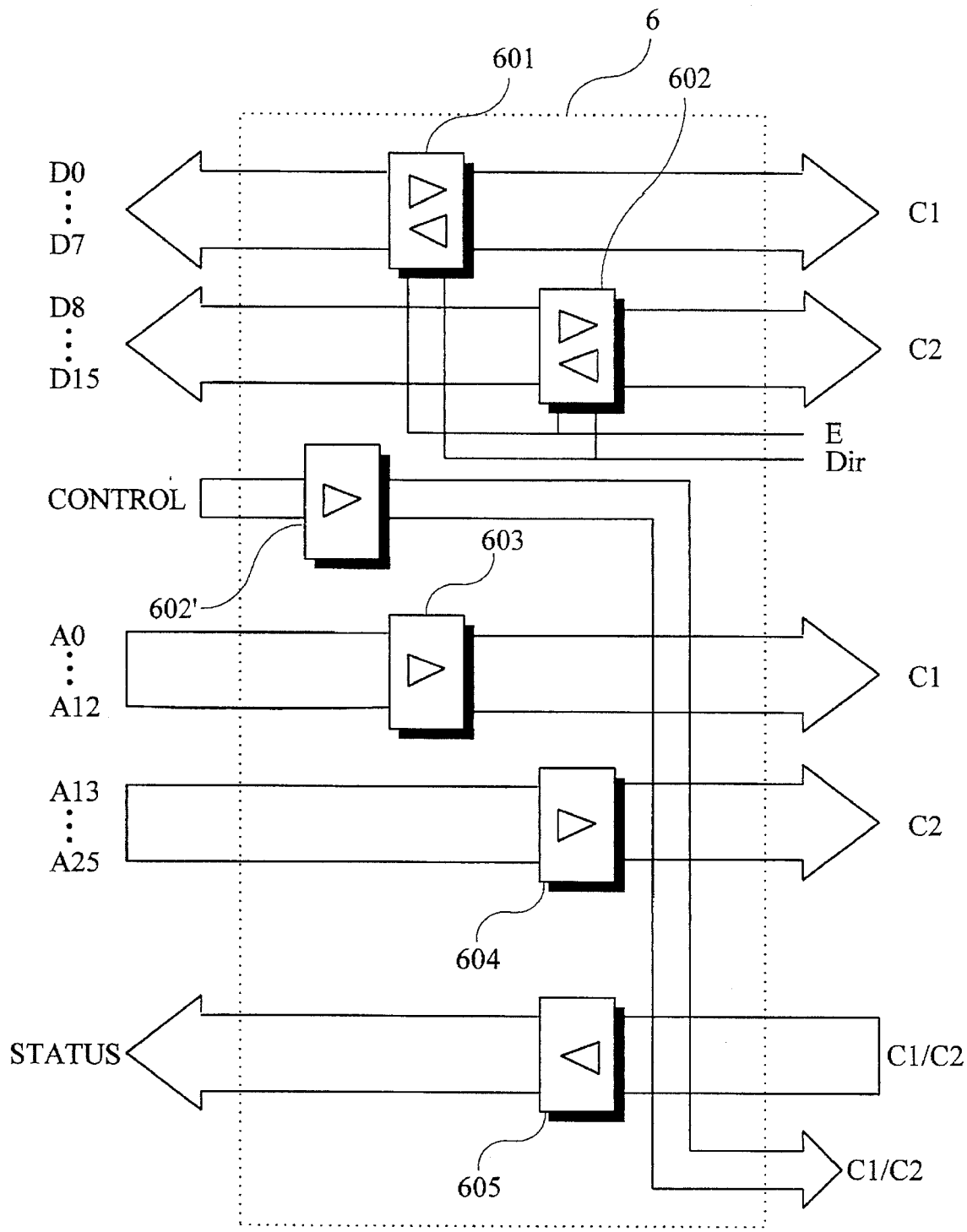
FIG. 4c is a bidirectional driver circuit according to an embodiment of the present invention.

FIG. 4c is a bidirectional driver 6 according to an embodiment of the present invention. In particular, bidirectional driver 6 includes first and second bidirectional bus driver circuits respectively 601 and 602 each controlled by enable and direction signals respectively E and Dir and respectively driving data buses for respective cables C1 and C2. The data bus for cable C1 includes data lines D0 through D7. The data lines D0-D15 can be interspersed as desired, so long as consistently driven for signal flow in a selected direction. Data signal lines within a cable are arranged according to selected design. The data bus for cable C2 includes data lines D8 through D15. Bidirectional driver 6 includes first and second unidirectional bus driver circuits respectively 603 and 604 respectively driving address buses for respective cables C1 and C2. The address bus for cable C1 includes address lines A0 through A12. The address bus for cable C2 includes address lines A13 through A25. Bidirectional driver 6 according to one embodiment of the present invention further includes a portion of a control line provided to cables C1 and C2. Bidirectional driver 6 further includes driver circuit 605 for providing status signals unidirectionllly from cables C1 and C2. Cables C1 and C2 are parallel cables within the meaning of the present invention.

Figure 5A:
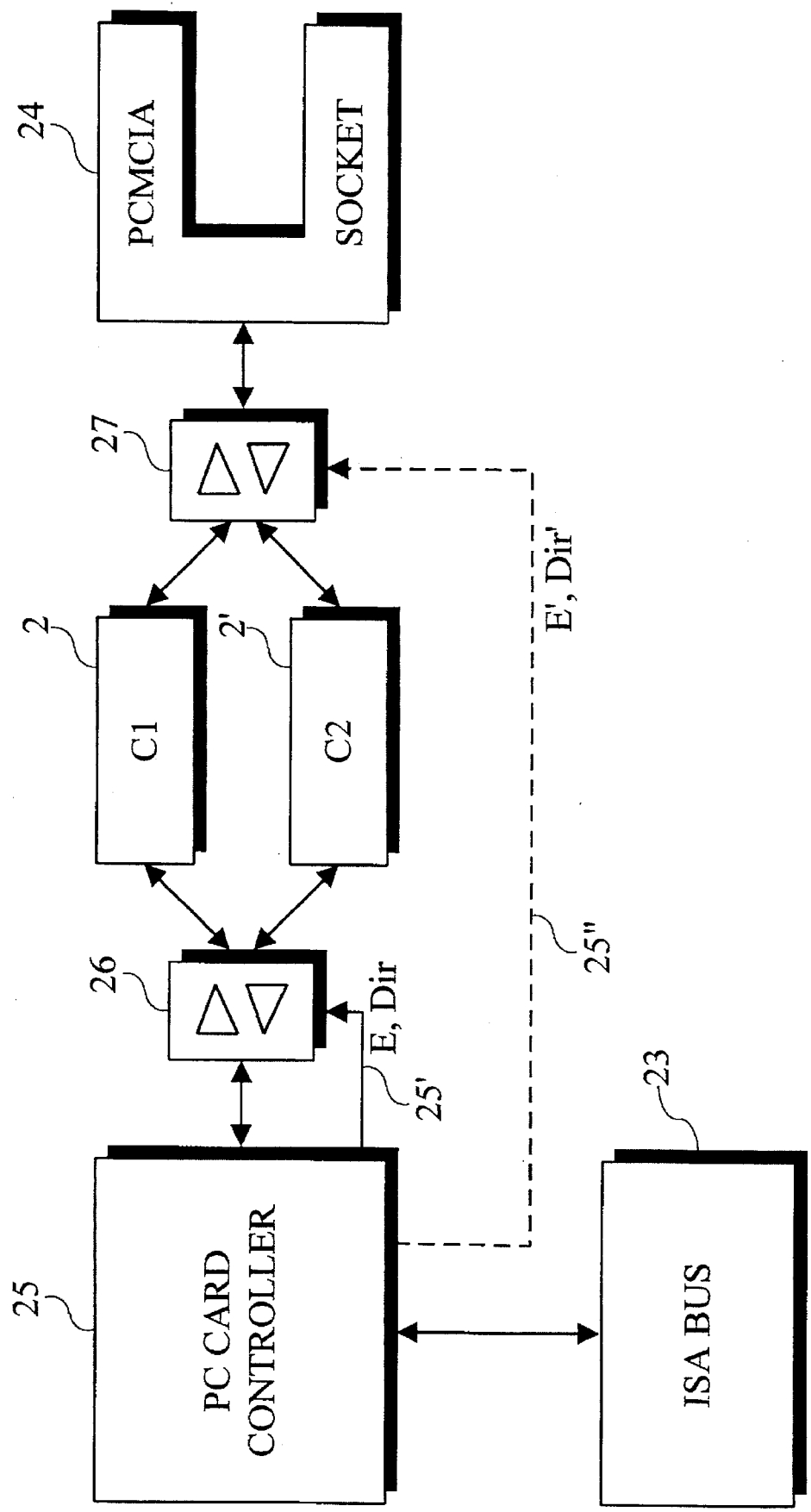
FIG. 5a is a PCMCIA system including an ISA bus, a PC card controller connected to the ISA bus, a PCMCIA slot connected with the PC card controller with first and second cables according to the present invention.

FIG. 5a is a PCMCIA system including an ISA bus 23, a PC card controller 25 connected to ISA bus 23, a PCMCIA socket 24 connected with PC card controller 25 with first and second parallel cables C1 and C2 respectively 2 and 2', according to the present invention. The PCMCIA system according to the present system further includes first and second bidirectional drivers 26 and 27 each connected to cables 2 and 2'. Bidirectional driver 26 is connected between PC card controller 25 and cables 2 and 2'. Bidirectional driver 26 is under control of PC card controller 25 which exercises control signals ENABLE (i.e., "E") and DIRECTION (i.e., "Dir"). ENABLE enables or disables bidirectional signal traffic through bi-directional driver 26. Bidirectional driver 27 is connected between PCMCIA socket 24 and cables 2 and 2'. Bidirectional driver 27 is under control of PC card controller 25 which exercises control signals 25", ENABLE (i.e., "E'") and DIRECTION (i.e., "Dir'"). ENABLE enables or disables bidirectional signal traffic through bi-directional driver 27.

Figure 5B:
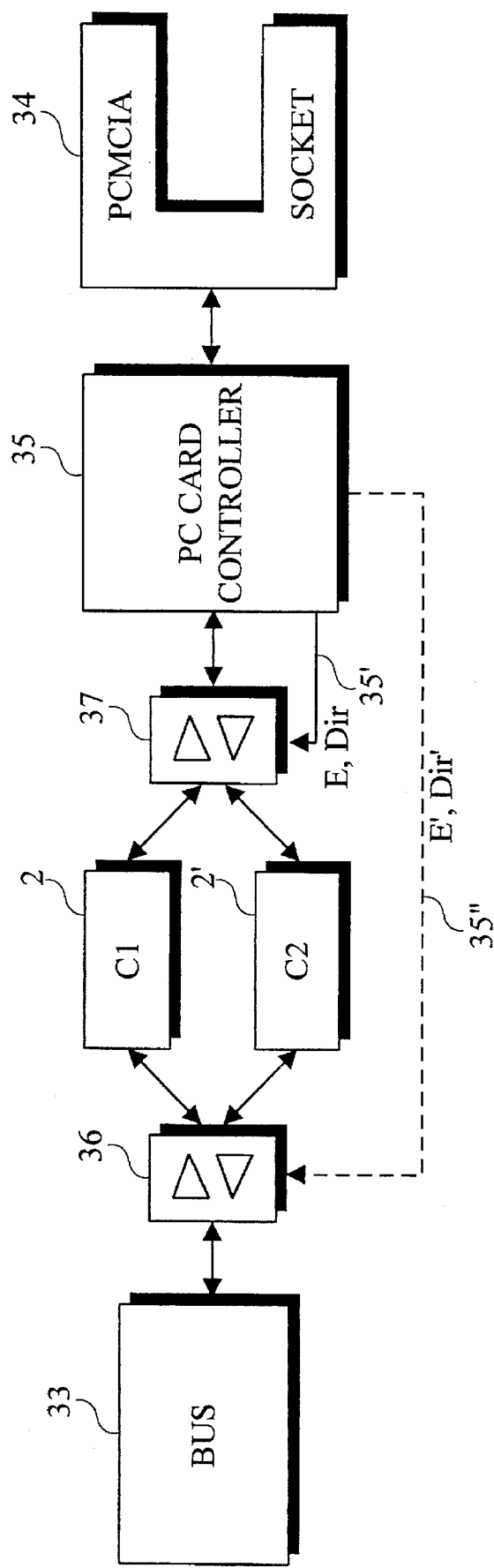
FIG. 5b is a PCMCIA system including an ISA bus, a PC card controller connected to the ISA bus, and an ISA bus connected with the PC card controller with first and second cables according to the present invention.

FIG. 5b is a PCMCIA system including an ISA bus 33, a PC card controller 35 connected to ISA bus 33, the ISA bus 33 being connected with PC card controller 35 with first and second cables C1 and C2, respectively 2 and 2', according to the present invention. The PCMCIA system according to the present system further includes first and second bidirectional drivers 36 and 37 each connected to cables 2 and 2'. Bidirectional driver 36 is connected between bus 33 and cables 2 and 2'. Bidirectional driver 36 is under control of PC card controller 35 which exercises control signals ENABLE (i.e., "E") and DIRECTION (i.e., "Dir") ENABLE enables or disables bidirectional signal traffic through bi-directional driver 36. Bidirectional driver 37 is connected between PC card controller 35 and cables 2 and 2'. Bidirectional driver 37 is under control of PC card controller 35 which exercises control signals 35", ENABLE (i.e., "E'") and DIRECTION (i.e., "Dir'"). ENABLE enables or disables bidirectional signal traffic through bidirectional driver 37.

Figure 6A:
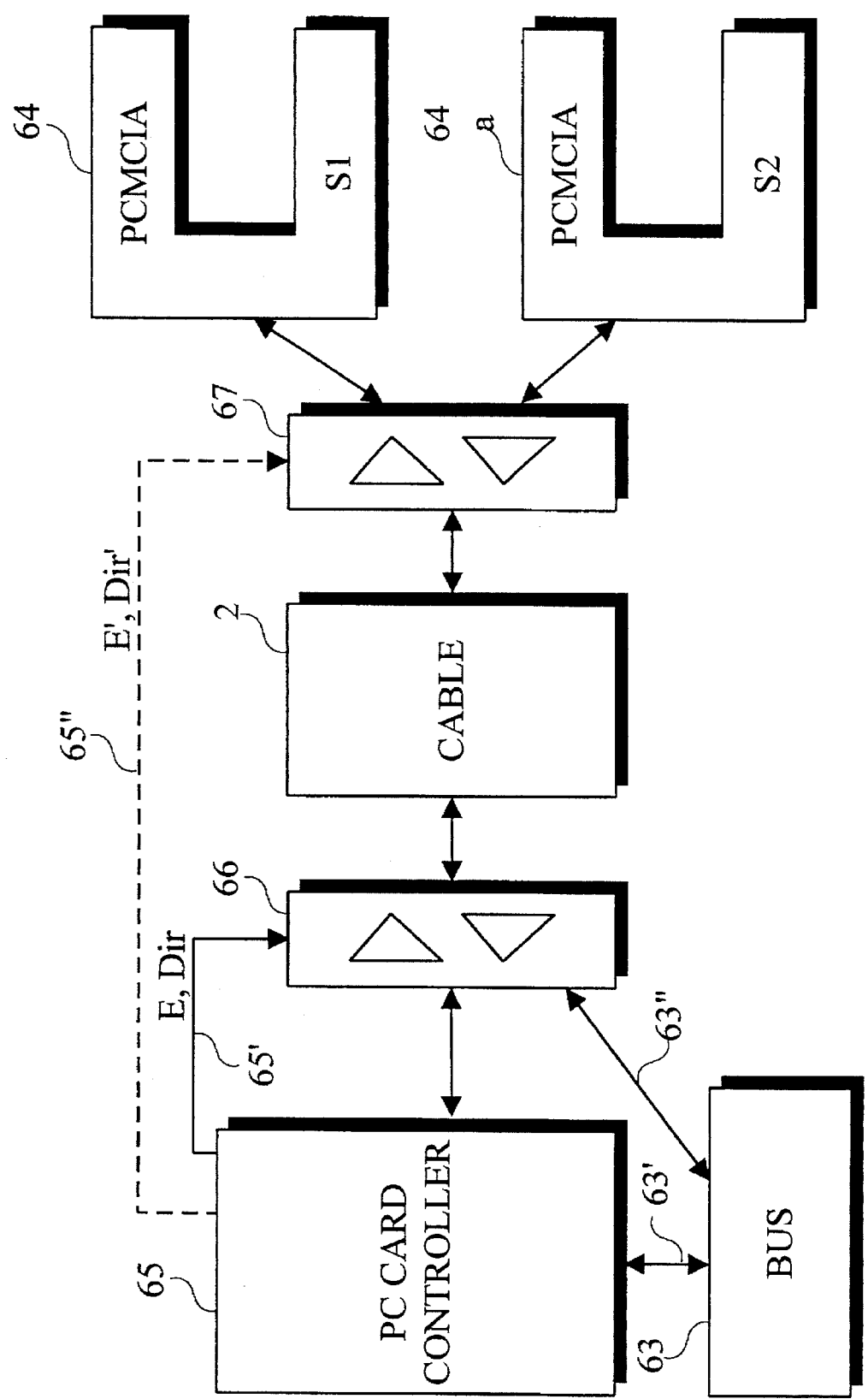
FIG. 6a is a PCMCIA system including an ISA bus, a PC card controller connected to the ISA bus, and first and second PCMCIA slots connected with the PC card controller with a cable according to the present invention, and showing a direct connection between the ISA bus and the cable.

FIG. 6a is a PCMCIA system including an ISA bus 63, a PC card controller 65 connected to ISA bus 63, and first and second PCMCIA sockets 64 and 64a connected with PC card controller 65 with a cable 2 according to the present invention, and showing a direct connection between ISA bus 63 and the cable 2 through a bidirectional driver 66. The PCMCIA system according to the present system further includes first and second bidirectional drivers 66 and 67 each connected to cable 2. Bidirectional driver 66 is connected between PC card controller 65 and cable 2. Bidirectional driver 66 is under control of PC card controller 65 which exercises control signals ENABLE (i.e., "E") and DIRECTION (i.e., "Dir"). ENABLE enables or disables bidirectional signal traffic through bi-directional driver 66. Bidirectional driver 67 is connected between PCMCIA sockets 64 and 64a and cable 2. Bidirectional driver 67 is under control of PC card controller 65 which exercises control signals 65", ENABLE (i.e., "E'") and DIRECTION (i.e., "Dir'"). ENABLE enables or disables bidirectional signal traffic through bi-directional driver 67.

Figure 6B:
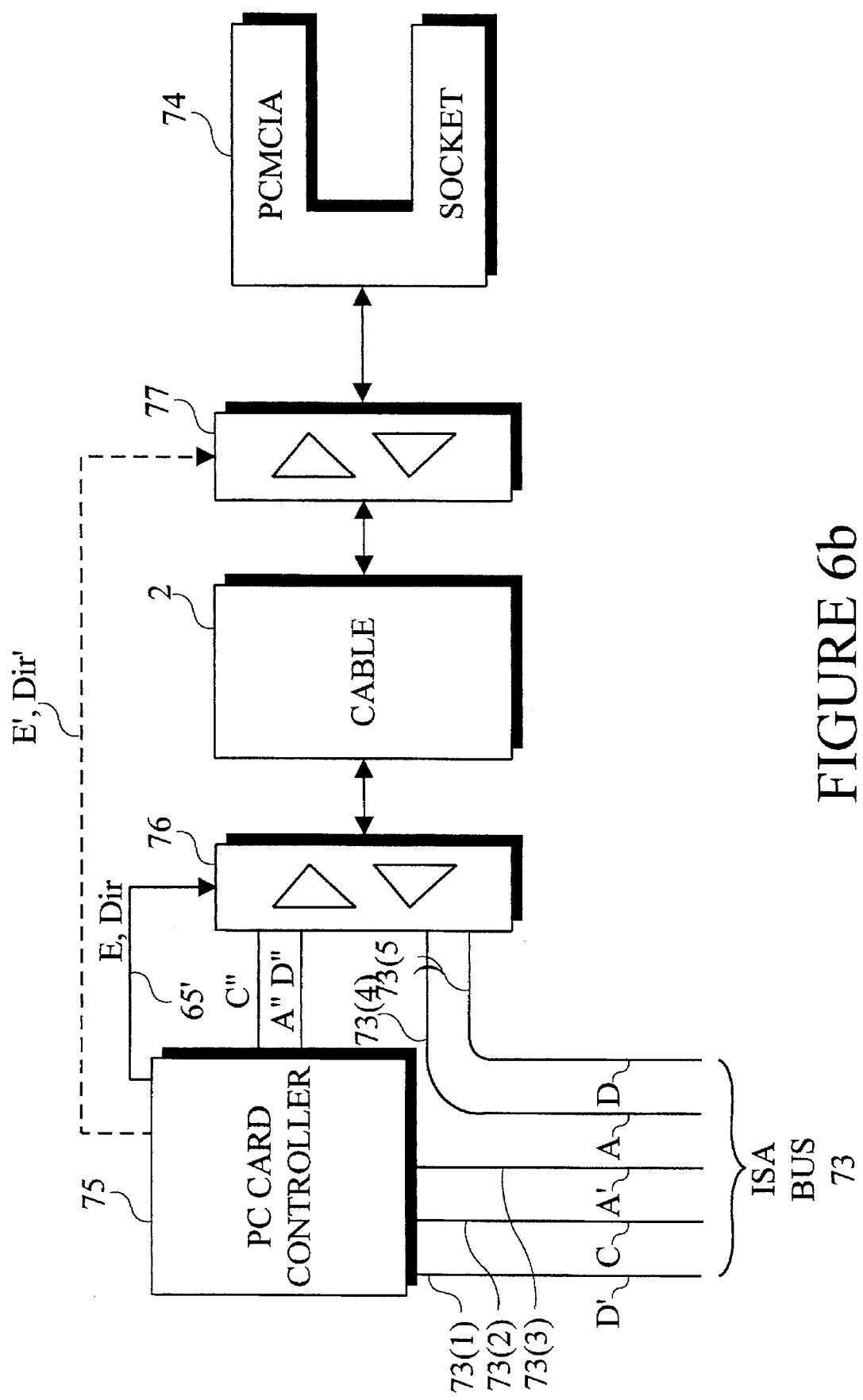
FIG. 6b is a PCMCIA system including an ISA bus, a PC card controller connected to the ISA bus, a PCMCIA slot connected with the PC card controller with a cable according to the present invention, and showing a direct connection between the ISA bus and the cable along a first data line and a first address line.

FIG. 6b is a PCMCIA system including an ISA bus 73, a PCCard® controller such as for example a VADEM VG-365 PC card controller 75 connected to ISA bus 73, a PCMCIA socket connected with PC card controller 75 with a cable 2 according to the present invention, and showing a direct connection between ISA bus 73 and the cable 2 along a first data line "D" and a first address line "A". ISA bus 73 includes first and second sets of data lines respectively D and D', first and second sets of address fines respectively A and A', and a set of control lines C. The PCMCIA system according to the present system further includes first and second bidirectional drivers 76 and 77 each connected to cable 2. Bidirectional driver 76 is connected between PC card controller 75 and cable 2. Bidirectional driver 76 is under control of PC card controller 75 which exercises control signals ENABLE (i.e., "E") and DIRECTION (i.e., "Dir"). ENABLE enables or disables bidirectional signal traffic through bi-directional driver 76. Bidirectional driver 77 is connected between PCMCIA socket 74 and cable 2. Bidirectional driver 77 is under control of PC card controller 75 which exercises control signals 75", ENABLE (i.e., "E'") and DIRECTION (i.e., "Dir'"). ENABLE enables or disables bidirectional signal traffic through bidirectional driver 77.

A cable is connected according to one embodiment of the present invention to a PC card controller such as Vadem VG-365 or a Vadem VG-469 PC card socket controller chips. These chips are compact, highly integrated PC card controller chips implementing the PC Card Standard. The chips have a 68-pin PCMCIA/JEIDA PC Card socket interface including 60 signals and 8 power connections.

Figure 7:
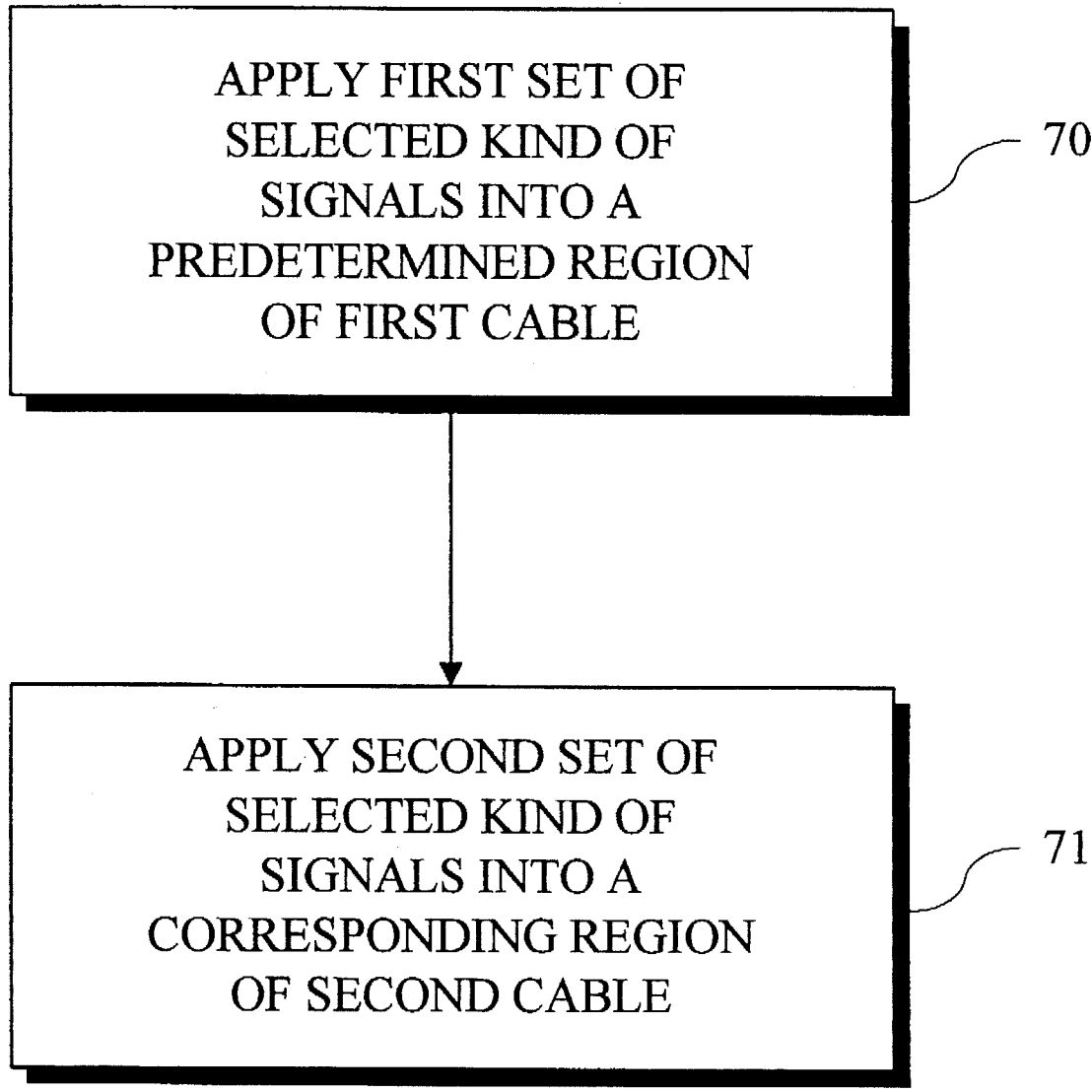
FIG. 7 is a flow chart of a method according to the present invention including providing a first set of control signals in a first cable, and providing a second set of control signals into a physically corresponding region of the second cable.

FIG. 7 is a flow chart of a method according to the present invention including providing 70 a first set of control signals in a first cable, and providing 71 a second set of control signals into a physically corresponding region of the second cable. The method of the present invention further includes providing a first set of data signals in a first cable, and providing a second set of data signals into a physically corresponding region of the second cable. The method of the present invention further includes providing a first set of address signals in a first cable, and providing a second set of address signals into a physically corresponding region of the second cable.

According to the present invention, for coordinated regions of similar kinds of signals lines in adjacent cables, a considerable reduction in crosstalk has been achieved, particularly when the adjacent regions are separated by one or more ground lines in each of the cables.

What is claimed is:

1. An interface system for at least a single PCMCIA socket, comprising:
    a first cable connected between a PCMCIA socket and a bus, including a first plurality of control pin lines and a first plurality of data pin lines; and
    a second cable connected between a PCMCIA socket and a bus, including a second plurality of control pin lines and a second plurality of data pin lines, said first and second cables connected parallel to each other and said first plurality of control pin lines being aligned adjacently to said second plurality of control pin lines.

2. The interface system according to claim 1, wherein said first plurality of data pin lines is aligned adjacently to said second plurality of data pin lines.

3. The interface system according to claim 1, further comprising first and second pluralities of address pin lines which are aligned adjacently to each other in respective ones of said first and second cables.

4. The interface system according to claim 1, further comprising first and second pluralities of status pin lines which are aligned adjacently to each other in respective ones of said first and second cables.

5. The interface system according to claim 1, further comprising a plurality of ground lines, each of said plurality of ground lines being fabricated between first and second control lines.

6. The interface system according to claim 1, wherein said first data pin lines are separated from said first control pin lines by at least a single ground line.

7. The interface system according to claim 1, wherein said second data pin lines are separated from said second control pin lines by at least a single ground line.

8. An interface system for at least a single PCMCIA socket, comprising:
    a first cable connected between a PCMCIA socket and a bus, including a first plurality of control pin lines and a first plurality of data pin lines; and
    a second cable connected between a PCMCIA socket and a bus, including a second plurality of control pin lines and a second plurality of data pin lines, said first and second cables connected parallel to each other and said first plurality of control pin lines being aligned adjacently to said second plurality of control pin lines, said first plurality of data pin lines being aligned adjacently to said second plurality of data pin lines, and comprising first and second pluralities of address pin lines which are aligned adjacently to each other in respective ones of said first and second cables.

9. An interface system for at least a single PCMCIA socket, comprising:
    a first cable connected between a PCMCIA socket and a bus, including a first plurality of control pin lines and a first plurality of data pin lines; and
    a second cable connected between a PCMCIA socket and a bus, including a second plurality of control pin lines and a second plurality of data pin lines, said first and second cables connected parallel to each other and said first plurality of data pin lines being aligned adjacently to said second plurality of data pin lines, and comprising first and second pluralities of address pin lines which are aligned adjacently to each other in respective ones of said first and second cables.

10. A method of signal transfer in a PCCard system including a paired ribbon cable system, comprising:
    applying a first set of control signals in said first cable at a selected first cable region, and
    applying a second set of control signals in said second cable at a data region of said second cable which corresponds physically to said first cable region.

11. The interface system according to claim 1, wherein said first and second cables are connected between a PCCard controller and a PCCard socket.

12. The interface system according to claim 1, wherein said first and second cables are connected to a PCCcard controller.

13. The interface system according to claim 1, further comprising a PCCard controller.

14. The interface system according to claim 1, further comprising a PCCard socket.

15. An interface system for at least a single PCMCIA socket, comprising:
    a first cable connected between a PCMCIA socket and a bus, including a first plurality of control pin lines and a first plurality of data pin lines;
    a second cable, connected between a PCMCIA socket and a bus, including a second plurality of control pin lines and a second plurality of data pin lines, said first and second cables connected parallel to each other and said first plurality of control pin lines being aligned adjacently to said second plurality of control pin lines, said first plurality of data pin lines being aligned adjacently to said second plurality of data pin lines, and comprising first and second pluralities of address pin lines which are aligned adjacently to each other in respective ones of said first and second cables;
    a PCCard controller coupled to said first and second cables; and
    a PCCard socket coupled to said first and second cables.

16. The interface system according to claim 15, further comprising a bidirectional driver connecting said PCCard controller and said first and second cables.

17. The interface system according to claim 15, further comprising a bidirectional driver connecting said PCCard socket and said first and second cables.

* * * * *